(12) United States Patent
Ong et al.

(10) Patent No.: US 6,795,430 B1
(45) Date of Patent: Sep. 21, 2004

(54) SERVICE-RELATED SIGNALING BETWEEN VOICE OVER INTERNET PROTOCOL SERVERS

(75) Inventors: Lyndon Y. Ong, San Jose, CA (US); Francois Audet, Santa Clara, CA (US); Mo R. Zonoun, Sunnyvale, CA (US)

(73) Assignee: Nortel Networks Limited, St. Laurent (CA)

( * ) Notice: Subject to any disclaimer, the term of this patent is extended or adjusted under 35 U.S.C. 154(b) by 899 days.

(21) Appl. No.: 09/616,343

(22) Filed: Jul. 14, 2000

(51) Int. Cl.[7] ............................................... H04L 12/66
(52) U.S. Cl. ..................... 370/352; 370/466; 379/88.17
(58) Field of Search ............................... 370/352–356, 370/400, 401, 389, 466, 467; 709/227, 203; 358/402; 379/201.12, 88.17; 704/270.1

(56) References Cited

U.S. PATENT DOCUMENTS 6,275,574 B1 * 8/2001 Oran ..................... 379/201.01
6,539,077 B1 * 3/2003 Ranalli et al. ............. 379/67.1
6,615,236 B2 * 9/2003 Donovan et al. ........... 709/203
6,625,141 B1 * 9/2003 Glitho et al. ............... 370/352

OTHER PUBLICATIONS

QSIG Handbook, Jorgen A. Richter, Telecommunications Directorate, DGXIII, European Commission, Brussels, Aug. 1995 (54 pages).

The Session Initiation Protocol (SIP), Henning Schulzrinne, Columbia University, New York, 1998–1999 (119 pages).

Multipurpose Internet Mail Extension, N. Freed and N. Borenstein, Network Working Group, Nov. 1996 (31 pages).

* cited by examiner

Primary Examiner—John Pezzlo
(74) Attorney, Agent, or Firm—Blakely Sokoloff Taylor & Zafman

(57) ABSTRACT

A method and system to provide voice over a network includes transmitting and receiving sides. On the transmitting side, a service message is created for a supplementary service using a signaling protocol over a network. The service message is encapsulated in a session message according to a session initiation protocol using a mail format. The mail format has a content type. The session message with the encapsulated service message is transmitted over the network. On the receiving side, a session message is received having a service message over a network. The service message is created for a supplementary service using a signaling protocol. The service message is encapsulated in the session message according to a session initiation protocol using a mail format. The mail format has a content type corresponding to the signaling protocol. The session message is parsed to retrieve the service message. The retrieved service message is processed to control the supplementary service.

60 Claims, 5 Drawing Sheets

SERVICE-RELATED SIGNALING BETWEEN VOICE OVER INTERNET PROTOCOL SERVERS

BACKGROUND

1. Field of the Invention

This invention relates to computer and/or telecommunications networks. In particular, the invention relates to voice signaling.

2. Description of Related Art

Support of voice supplementary services in enterprise Voice Over Internet Protocol (VoIP) networks requires that call servers that provide call processing interact with each other via exchange of signaling messages. This allows services to be supported across a community of call servers rather than only within a single server.

Current VoIP systems have very limited service capabilities and services are limited to basic call on any calls that cross multiple call servers. One approach is to add supplementary services signaling directly to the Session Initiation Protocol (SIP). However, this approach requires significant protocol development, which may require an extended development time. Another approach is to add Integrated Service Digital Network User Part (ISUP) signaling encapsulation in SIP. However, this approach only addresses carrier voice services and does not address enterprise voice services because ISUP is not significantly used within enterprise networks.

Therefore, there is a need to have a technique that provides fast implementation of services and does not require significant development efforts.

SUMMARY

The present invention is a method and system to provide voice over a network. The system includes transmitting and receiving sides. On the transmitting side, a service message is created for a supplementary service using a signaling protocol over a network. The service message is encapsulated in a session message according to a session initiation protocol using a mail format. The mail format has a content type. The session message with the encapsulated service message is transmitted over the network. On the receiving side, a session message is received having a service message over a network. The service message is created for a supplementary service using a signaling protocol. The service message is encapsulated in the session message according to a session initiation protocol using a mail format. The mail format has a content type corresponding to the signaling protocol. The session message is parsed to retrieve the service message. The retrieved service message is processed to control the supplementary service.

According to one embodiment of the present invention, the content type is defined to correspond to the signaling protocol. The network is an Internet Protocol. The signaling protocol is one of a standard signaling protocol (e.g., QSIG) and a proprietary signaling protocol. The supplementary service is a voice over the network. The mail format is a multipurpose internet mail extensions (MIME) format.

The advantages of the invention include: (1) widespread utility because services are supported across a community of call servers, (2) ease of implementation because the technique uses existing service logic that has been already developed for narrow-band voice networks, (3) flexibility to mix multiple call servers, potentially from different vendors.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

Figure 1:
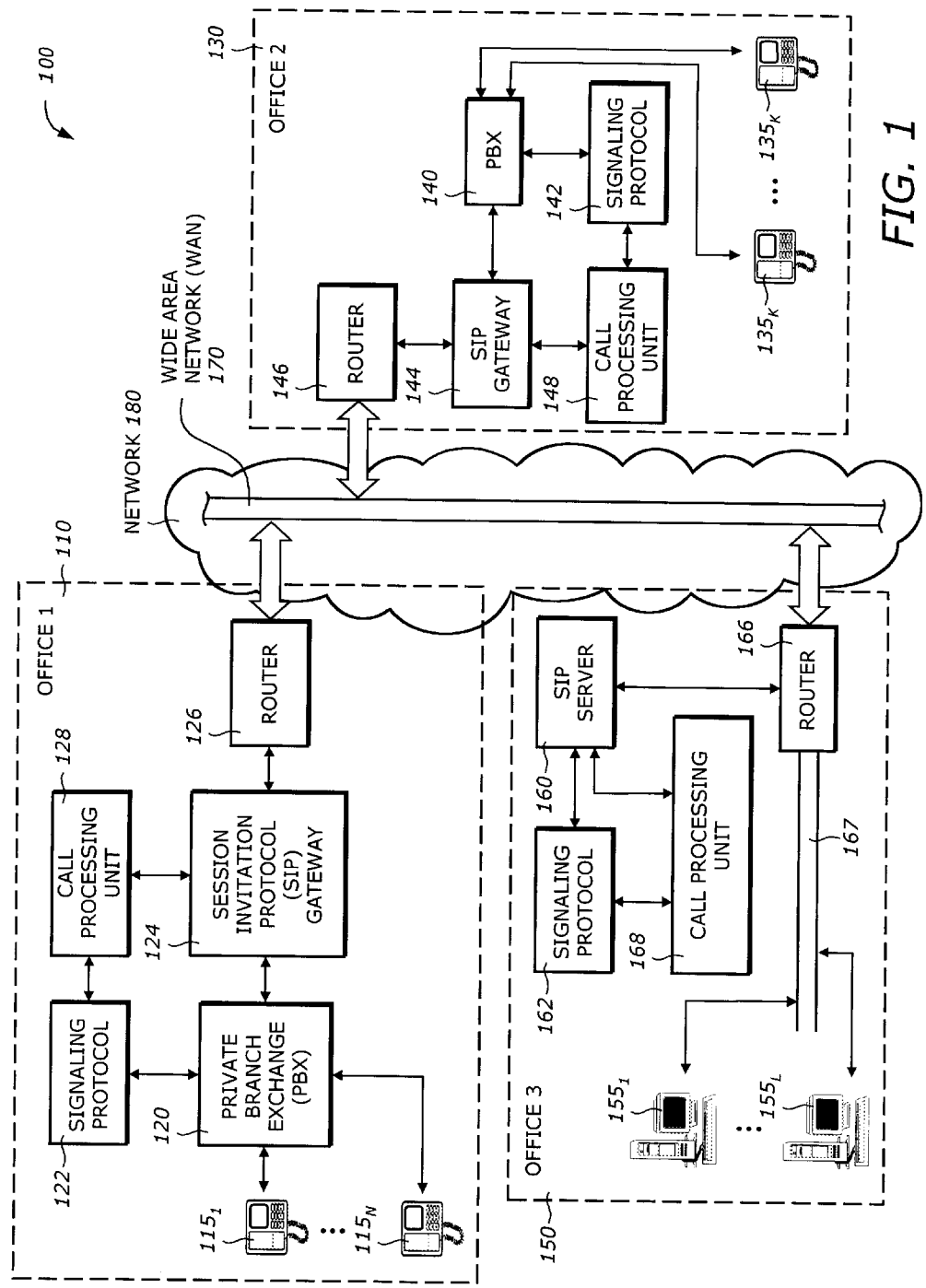
FIG. 1 is a diagram illustrating a system according to one embodiment of the invention.

The present invention relates to a method and system to provide voice over a network. The system includes transmitting and receiving sides. On the transmitting side, a service message is created for a supplementary service using a signaling protocol over a network. The service message is encapsulated in a session message according to a session initiation protocol using a mail format. The mail format has a content type. The session message with the encapsulated service message is transmitted over the network. On the receiving side, a session message is received having a service message over a network. The service message is created, typically at the transmitter side, for a supplementary service using a signaling protocol. The service message is encapsulated in the session message according to a session initiation protocol using a mail format. The mail format has a content type corresponding to the signaling protocol. The session message is parsed to retrieve the service message. The retrieved service message is processed to control the supplementary service.

According to one embodiment of the present invention, the content type is defined to correspond to the signaling protocol. The network is an Internet Protocol. The signaling protocol is one of a standard signaling protocol (e.g., QSIG) and a proprietary signaling protocol. The supplementary service is a voice over the network. The mail format is a multipurpose internet mail extensions (MIME) format.

The present invention offers a number of advantages: (1) widespread utility because services are supported across a community of call servers, (2) ease of implementation because the technique uses existing service logic that has been already developed for narrow-band voice networks, (3) flexibility to mix multiple call servers, potentially from different vendors.

To provide support for supplementary services in enterprise VoIP networks, two components are necessary: (1) control over the voice packets, transmitted using Real Time Protocol (RTP), and (2) control over supplemetary services information, transmitted using either a standard signaling protocol such as QSIG, or a proprietary signaling protocol.

The present invention uses QSIG or a proprietary protocol in conjunction with the SIP VoIP signaling protocol which can control the establishment of a session and the characteristics of the voice packets. The SIP messages follow a multi-part MIME format that can carry different protocols as part of the body of the message. By defining a MIME type corresponding to QSIG, a QSIG message can be encapsulated in a SIP message, so that the SIP message portion is used to control the voice packet characteristics while the QSIG portion (or an encapsulated proprietary portion) is used to access supplementary services logic and control the voice supplementary service.

The present invention includes at least two elements: (1) definition of a MIME type that allows SIP to carry enterprise supplementary service signaling such as QSIG or a proprietary protocol, and (2) use of QSIG or a proprietary protocol or other existing narrow-band signaling protocols to support supplementary services in a VoIP network. The originating call server sends a SIP INVITE message with a MIME type indicating that QSIG (or a proprietary protocol) is carried in the body, and includes a QSIG message such as SETUP that holds supplementary services-related information. The receiving call server then accesses the QSIG information and feeds this into its service logic to control supplementary services associated with the call. Subsequent SIP INFO, ACK, and other messages and their responses carry any necessary additional QSIG information similarly encapsulated.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the method is implemented in a station as a software routine, hardware circuit, firmware, or a combination thereof. The invention, however, extends to all such embodiments and/or implementations.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium.

FIG. 1 is a diagram illustrating a system 100 in which one embodiment, according to one embodiment of the invention, can be implemented. The system 100 includes offices 110, 130 and 150, and network 180.

Each of the offices 110, 130, and 150 represents a typical enterprise office environment. The office 1 110 includes N telephone units $115_1$ to $115_N$, a private branch exchange (PBX) 120, a session initiation protocol (SIP) gateway 124, a signaling protocol 122, a call processing unit 128, and a router 126. The telephone units $115_1$ to $115_N$ provide voice communication routed through the PBX 120. The PBX 120 is configured as a private integrated services network exchange (PINX) equipment having capability for the signaling protocol 122. The signaling protocol 122 is a protocol that may be standardized or proprietary. A standardized signaling protocol can support multiple equipment from multiple vendors for inter-operability. In one embodiment, the signal protocol 122 is QSIG, a global signaling system for corporate networking.

The SIP gateway 124 provides session initiation to handle session messages corresponding to voice communication. The SIP supports a number of session messages such as a call initiation (e.g., INVITE), a response confirmation (e.g., ACK), a call termination (e.g., BYE), a cancellation (e.g., CANCEL), a support (e.g., OPTIONS), and a service registration (e.g., REGISTER).

The call processing unit 128 processes the call to be transmitted to or received from the network 180. The call processing unit 128 may be implemented as a subsystem attached to the SIP gateway 124, or as part of the SIP gateway 124. The call processing unit 128 may also be implemented by hardware or software. When implemented by software, the call processing unit 128 includes a computer program product having a machine readable medium which contains program codes to perform specified tasks.

The router 126 routes a message transmitted from the SIP gateway 124 to the network 180 or a message received from the network 180 to the SIP gateway 124.

The office 130 essentially contain similar components as the office 110. In particular, the office 130 includes K telephone units $135_1$ to $135_K$, a private branch exchange (PBX) 140, a session initiation protocol (SIP) gateway 144, a signaling protocol 142, a call processing unit 148, and a router 146. These components have the same function as the respective components in the office 110 described above.

The office 150 also has similar components as the offices 110 and 130. In particular, the office 150 includes LSIP stations $155_1$ to $155_L$ having telephone or call processing capability, a session initiation protocol (SIP) server 160, a signaling protocol 162, a call processing unit 168, and a router 166. Each of the SIP stations $155_1$ to $155_L$ may be a computer system having interface for voice communication. The SIP stations are coupled to the router 166 via a routing bus 167.

The network 180 provides network communication to the offices 110, 130, and 150. In one embodiment, the network 180 is the Internet. The network 180 may also be implemented as an Asynchronous Transfer Mode (ATM) network, a frame relay, or any combination thereof. The network 180 includes a wide area network (WAN) 170, a Local Area Network (LAN), or an intranet, etc.

The system 100 allows data and voice communication between one office to another via the network 180. For example, a call may be placed from one of the telephone units $115_1$ to $115_N$ to one of the SIP stations $155_1$ to $155_L$. The voice communication is carried over the network 180 together with data services and information. Each of the offices 110, 130, and 150 has service logic and voice over network processing units to control voice over a data network. In particular, these service logic and VoIP processing units are available on existing equipment and therefore there is no need to redesign the equipment or incorporate new protocol to support supplementary services such as the VoIP.

Figure 2:
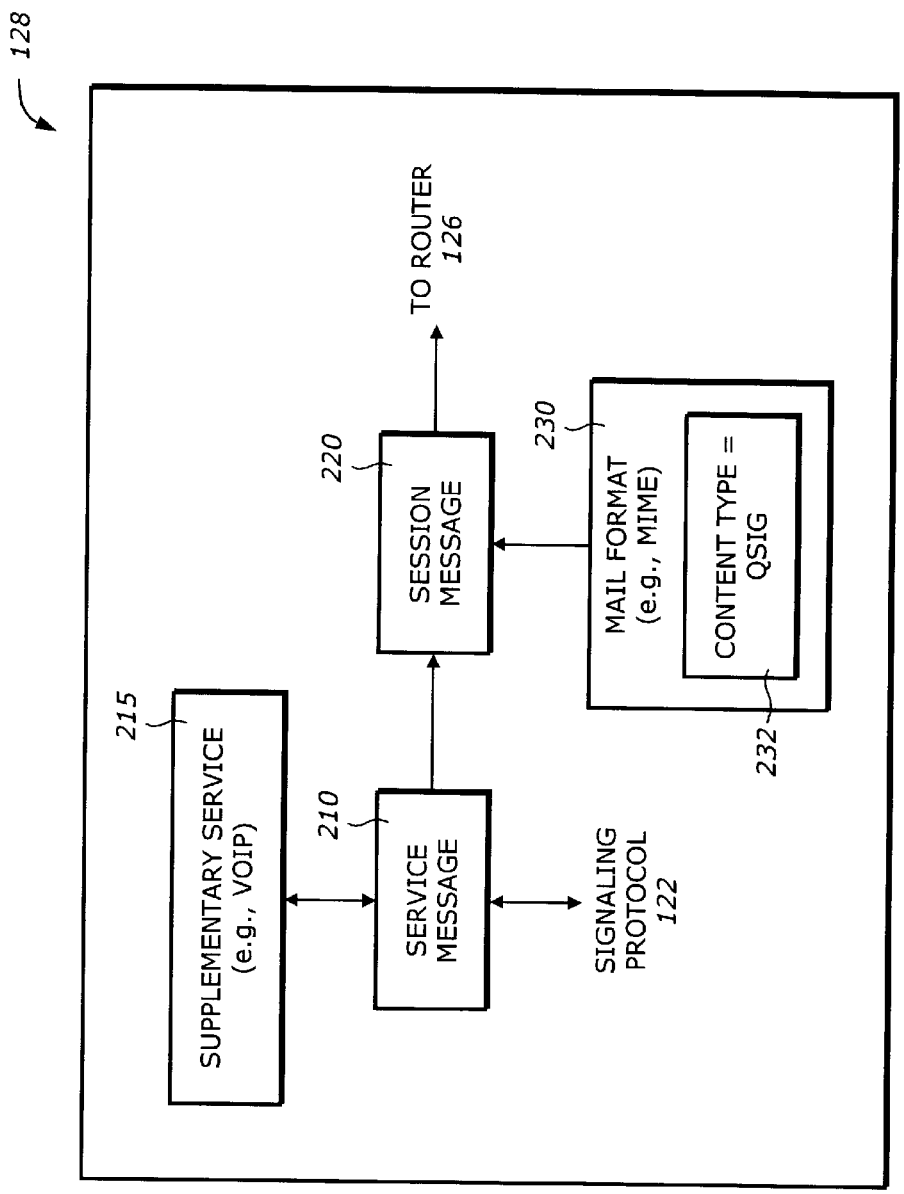
FIG. 2 is a diagram illustrating the call processing unit shown in FIG. 1 according to one embodiment of the invention.

FIG. 2 is a diagram illustrating the call processing unit 128 shown in FIG. 1 according to one embodiment of the invention. In this embodiment, the call processing unit 128 includes a service message 210, a supplementary service 215, a session message 220, and a mail format 230.

The service message 210 is the message containing the voice information to be transmitted over the network. The service message 210 is created for the supplementary service 215 using the signaling protocol 122. The session message 220 is a message used with a session initiation protocol (SIP). The session message 220 encapsulates the service message 210 according to a session initiation protocol using the mail format 230. The mail format 230 has a content type which is defined to correspond to the signaling protocol 122 (e.g., QSIG). In one embodiment, the mail format 230 is a multipurpose internet mail extensions (MIME) format. The MIME format has a content-type header field. When the service message 210 is encapsulated with the session message 220, the content-type is defined to correspond to the signaling protocol. After the encapsulating process, the session message 220 is transmitted over the network 180 via the router 126.

Figure 3A:
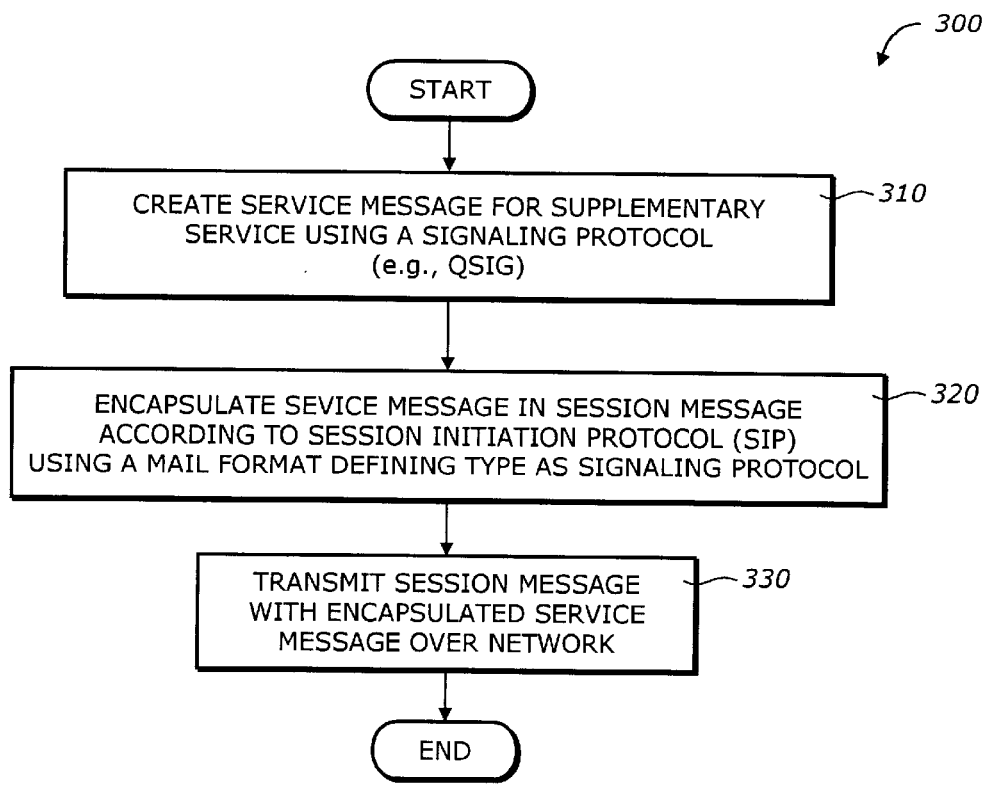
FIG. 3A is a flowchart illustrating a transmission process to provide voice over IP according to one embodiment of the invention.

FIG. 3A is a flowchart illustrating a transmission process 300 to provide voice over IP according to one embodiment of the invention.

Upon START, the process 300 creates a service message for supplementary services using a signal protocol (e.g., QSIG), (Block 310). Then the process 300 encapsulates the service message 210 in the session message 220 according to the session initiation protocol and a mail format (Block 320). The mail format defines the type as the signaling protocol. Then, the process 300 transmits the session message with the encapsulated service message over the network (Block 330). Then the process 300 is terminated.

Figure 3B:
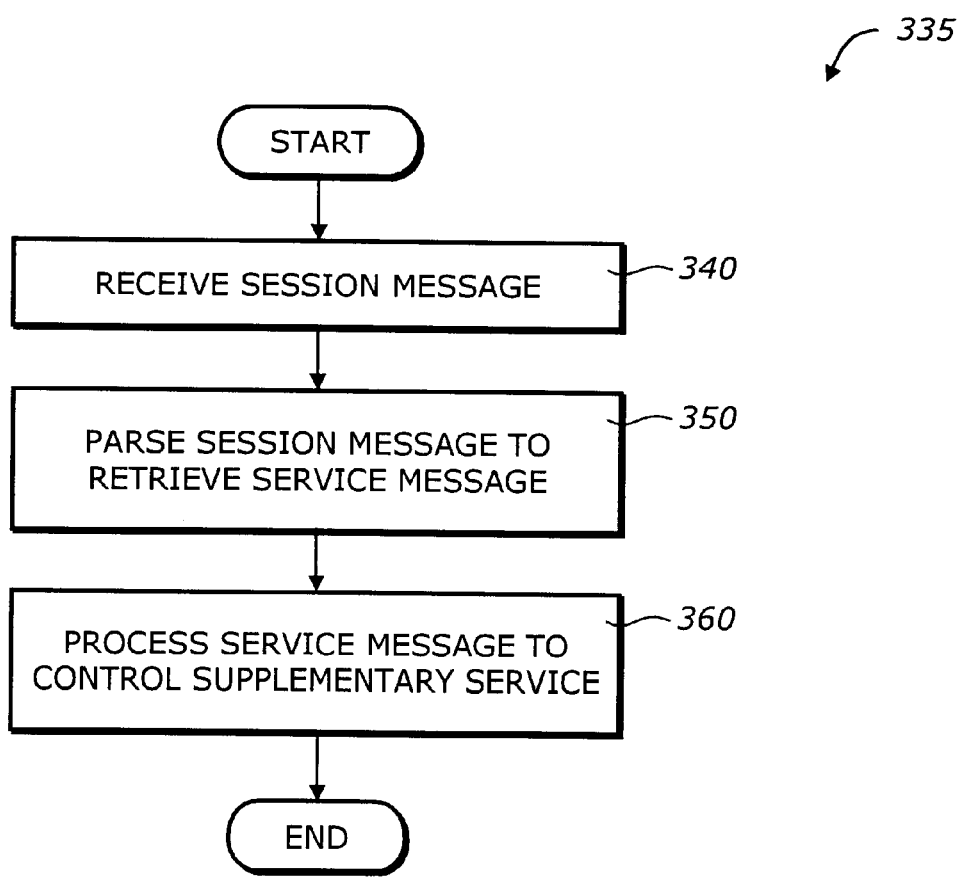
FIG. 3B is a flowchart illustrating a receiving process to provide voice over IP according to one embodiment of the invention.

FIG. 3B is a flowchart illustrating a receiving process 335 to provide Voice Over IP according to one embodiment of the present invention.

Upon START, process 335 receives the session message (Block 340). Then the process 335 parses the session message to retrieve or extract the service message (Block 350). Next, the process 335 processes the service message to control the supplementary service (Block 360), in one embodiment the voice over data network or voice over IP. The process 335 is then terminated.

Figure 4:
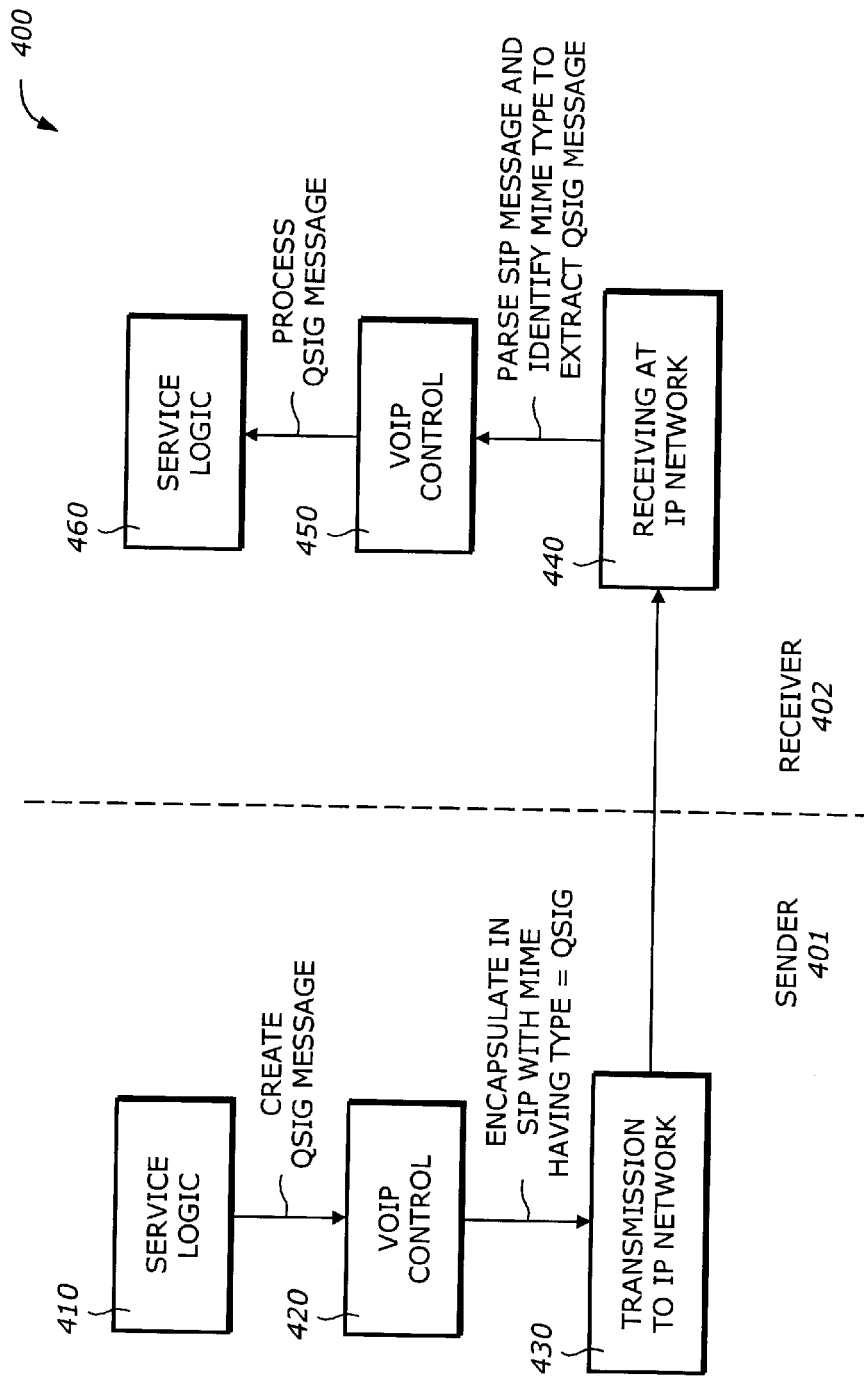
FIG. 4 is a diagram illustrating a process flow for voice over IP according to one embodiment of the invention.

FIG. 4 is a diagram illustrating a process flow 400 for voice over IP according to one embodiment of the invention. The process flow 400 includes a sender side 401 and a receiver side 402.

The sender side 401 includes a service logic 410, a voice over IP control 420, and a transmission 430. Starting from the service logic, the QSIG message is created and is then forwarded to the VoIP control 420. From the VoIP control 420, the signaling protocol (e.g., QSIG) message is encapsulated with the mail format (e.g., MIME) having the type as the signaling protocol. The message is then forwarded to the transmission unit 430 for transmission to the receiver 402 via the network.

The receiver 402 includes a receiving unit 460, a voice over IP control 450, and a service logic 460. The receiving unit 460 receives the message from the network. From the receiving unit 460, the SIP message is parsed and the MIME type is identified. Then the service message is extracted to be forwarded to the voice over IP control 450. Then the signaling protocol message is processed by the service logic 460 to provide the supplementary service of voice over IP.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are within the spirit and scope of the invention.

What is claimed is:

1. A method comprising:
   creating a service message for a supplementary service using a signaling protocol over a network;
   encapsulating the service message in a session message according to a session initiation protocol using a mail format, the mail format having a content type; and
   transmitting the session message with the encapsulated service message over the network.

2. The method of claim 1 wherein encapsulating comprises:
   defining the content type to correspond to the signaling protocol.

3. The method of claim 1 wherein the network is based on an Internet Protocol (IP).

4. The method of claim 1 wherein the signaling protocol is a standard signaling protocol.

5. The method of claim 4 wherein the standard signaling is QSIG.

6. The method of claim 1 wherein the signaling protocol is a private integrated services network exchange (PINX) signaling protocol.

7. The method of claim 1 wherein the supplementary service is a voice over the data network.

8. The method of claim 1 wherein the mail format is a multipurpose internet mail extensions (MIME) format.

9. The method of claim 1 wherein the session message is one of a call initiation, a response confirmation, a call termination, a cancellation, a support, and a service registration.

10. The method of claim 1 wherein transmitting the session message comprises:
    transmitting the session message via a private branch exchange (PBX) across the network.

11. A method comprising:
    receiving a session message having a service message over a network, the service message being created for a supplementary service using a signaling protocol, the service message being encapsulated in the session message according to a session initiation protocol using a mail format, the mail format having a content type corresponding to the signaling protocol;
    parsing the session message to retrieve the service message; and
    processing the retrieved service message to control the supplementary service.

12. The method of claim 11 wherein parsing comprises:
    identifying the content type for the signaling protocol.

13. The method of claim 11 wherein the network is based on an Internet Protocol (IP).

14. The method of claim 11 wherein the signaling protocol is a standard signaling protocol.

15. The method of claim 14 wherein the standard signaling is QSIG.

16. The method of claim 11 wherein the signaling protocol is a private integrated services network exchange (PINX) signaling protocol.

17. The method of claim 11 wherein the supplementary service is a voice over the network.

18. The method of claim 11 wherein the mail format is a multipurpose internet mail extensions (MIME) format.

19. The method of claim 11 wherein the session message is one of a call initiation, a response confirmation, a call termination, a cancellation, a support, and a service registration.

20. The method of claim 11 wherein receiving the session message comprises:

receiving the session message via a private branch exchange PBX across the network.

21. A computer program product comprising:
a machine useable medium having computer program code embedded therein, the computer program product having:
computer readable program code to create a service message for a supplementary service using a signaling protocol over a network;
computer readable program code to encapsulate the service message in a session message according to a session initiation protocol using a mail format, the mail format having a content type; and
computer readable program code to transmit the session message with the encapsulated service message over the network.

22. The computer program product of claim 21 wherein the computer readable program code to encapsulate comprises:
computer readable program code to define the content type to correspond to the signaling protocol.

23. The computer program product of claim 21 wherein the network is based on an Internet Protocol.

24. The computer program product of claim 21 wherein the signaling protocol is a standard signaling protocol.

25. The computer program product of claim 24 wherein the standard signaling is QSIG.

26. The computer program product of claim 21 wherein the signaling protocol is a private integrated services network exchange (PINX) signaling protocol.

27. The computer program product of claim 21 wherein the supplementary service is a voice over the network.

28. The computer program product of claim 21 wherein the mail format is a multipurpose internet mail extensions (MIME) format.

29. The computer program product of claim 21 wherein the session message is one of a call initiation, a response confirmation, a call termination, a cancellation, a support, and a service registration.

30. The computer program product of claim 21 wherein the computer readable program code to transmit the session message comprises:
computer readable program code to transmit the session message via a private branch exchange (PBX) across the network.

31. A computer program product comprising:
a machine useable medium having computer program code embedded therein, the computer program product having:
computer readable program code to receive a session message having a service message over a network, the service message being created for a supplementary service using a signaling protocol, the service message being encapsulated in the session message according to a session initiation protocol using a mail format, the mail format having a content type corresponding to the signaling protocol;
computer readable program code to parse the session message to retrieve the service message; and
computer readable program code to process the retrieved service message to control the supplementary service.

32. The computer program, product of claim 31 wherein the computer readable program code to parse comprises:
computer readable program code to identify the content type for the signaling protocol.

33. The computer program product of claim 31 wherein the network is an Internet Protocol.

34. The computer program product of claim 31 wherein the signaling protocol is one of a standard signaling protocol and a proprietary signaling protocol.

35. The computer program product of claim 34 wherein the standard signaling is QSIG.

36. The computer program product of claim 31 wherein the signaling protocol is a private integrated services network exchange (PINX) signaling protocol.

37. The computer program product of claim 31 wherein the supplementary service is a voice over the network.

38. The computer program product of claim 31 wherein the mail format is a multipurpose internet mail extensions (MIME) format.

39. The computer program product of claim 31 wherein the session message is one of a call initiation, a response confirmation, a call termination, a cancellation, a support, and a service registration.

40. The computer program product of claim 31 wherein the computer readable program code to receive the session message comprises:
computer readable program code to receive the session message via a private branch exchange (PBX) across the network.

41. A system comprising:
a gateway configured to handle a call using a session initiation protocol over a network; and
a call processing unit coupled to the gateway to transmit the call to the network, the call including a session message having a service message, the service message being created for a supplementary service using a signaling protocol, the service message being encapsulated in the session message according to the session initiation protocol using a mail format, the mail format having a content type corresponding to the signaling protocol.

42. The system of claim 41 wherein the content type is defined to correspond to the signaling protocol.

43. The system of claim 41 wherein the network is based on an Internet Protocol.

44. The system of claim 41 wherein the signaling protocol is a standard signaling protocol.

45. The system of claim 44 wherein the standard signaling is QSIG.

46. The system of claim 41 wherein the signaling protocol is a private integrated services network exchange (PINX) signaling protocol.

47. The system of claim 41 wherein the supplementary service is a voice over the network.

48. The system of claim 41 wherein the mail format is a multipurpose internet mail extensions (MIME) format.

49. The system of claim 41 wherein the session message is one of a call initiation, a response confirmation, a call termination, a cancellation, a support, and a service registration.

50. The system of claim 41 further comprises:
a private branch exchange (PBX) coupled to the gateway to transmit the session message.

51. A system comprising:
a gateway configured to handle a call using a session initiation protocol over a network; and
a call processing unit coupled to the gateway to receive a session message having a service message over a network, the service message being created for a supplementary service using a signaling protocol, the service message being encapsulated in the session message according to a session initiation protocol using a mail format, the mail format having a content type corresponding to the signaling protocol, the call processing unit comprising:
- a parser to parse the session message to retrieve the service message, and
- a service processor to process the retrieved service message to control the supplementary service.

52. The system of claim 51 wherein the parser identifies the content type to correspond to the signaling protocol.

53. The system of claim 51 wherein the network is based on an Internet Protocol.

54. The system of claim 51 wherein the signaling protocol is a standard signaling protocol.

55. The system of claim 54 wherein the standard signaling is QSIG.

56. The system of claim 51 wherein the signaling protocol is a private integrated services network exchange (PINX) signaling protocol.

57. The system of claim 51 wherein the supplementary service is a voice over the network.

58. The system of claim 51 wherein the mail format is a multipurpose internet mail extensions (MIME) format.

59. The system of claim 51 wherein the session message is one of a call initiation, a response confirmation, a call termination, a cancellation, a support, and a service registration.

60. The system of claim 51 further comprises:
- a private branch exchange (PBX) coupled to the gateway to receive the session message.

* * * * *